US006599055B2

(12) United States Patent
Auer et al.

(10) Patent No.: US 6,599,055 B2
(45) Date of Patent: Jul. 29, 2003

(54) CONNECTION ELEMENT FOR CONNECTING TWO COMPONENTS OF A PARTITION WALL AS WELL AS THE USE OF SUCH A CONNECTION ELEMENT

(75) Inventors: Karl-Heinz Auer, Burk (DE); Nicole Liebrich, Aalen (DE)

(73) Assignee: Preform GmbH, Feuchtwangen (DE)

( * ) Notice: Subject to any disclaimer, the term of this patent is extended or adjusted under 35 U.S.C. 154(b) by 0 days.

(21) Appl. No.: 09/815,455

(22) Filed: Mar. 23, 2001

(65) Prior Publication Data

US 2001/0019683 A1 Sep. 6, 2001

Related U.S. Application Data

(63) Continuation of application No. PCT/EP99/06923, filed on Sep. 18, 1999.

(51) Int. Cl.[7] .................................................. F16D 1/00
(52) U.S. Cl. .......................... 403/381; 52/71; 160/135; 16/225
(58) Field of Search ................................. 403/201, 381, 403/396; 52/71; 160/135; 16/225

(56) References Cited

U.S. PATENT DOCUMENTS

| | | | |
|---|---|---|---|
| 2,210,652 A | * | 8/1940 | Dennett |
| 3,132,432 A | * | 5/1964 | Yee |
| 3,234,996 A | * | 2/1966 | King et al. |
| 3,460,282 A | * | 8/1969 | Swirsky |
| 4,103,465 A | * | 8/1978 | McDonald, Jr. |
| 4,395,856 A | * | 8/1983 | Smith et al. |
| 4,805,365 A | * | 2/1989 | Bastian |
| 4,968,171 A | * | 11/1990 | Shell |
| 5,133,108 A | * | 7/1992 | Esnault |
| 5,148,850 A | * | 9/1992 | Urbanick |
| 5,242,241 A | * | 9/1993 | Nelson |
| 5,339,576 A | * | 8/1994 | Fussler |
| 5,502,930 A | * | 4/1996 | Burkette et al. |
| 5,816,000 A | * | 10/1998 | Izatt et al. |

\* cited by examiner

Primary Examiner—Lynne H. Browne
Assistant Examiner—Ernesto Garcia
(74) Attorney, Agent, or Firm—Katten Muchin Zavis Rosenman

(57) ABSTRACT

Connecting element (1) for connecting two components of a partition wall, comprising two clamping flanges (2,3) interconnected by a connecting rod (4). Said element has an asymmetric configuration due to the fact that the clamping flanges (2,3) have different cross sections. At least parts of the contour of the first clamping flange (2) are unrounded while at least certain parts of the contour of the second clamping flange (3) are rounded.

18 Claims, 7 Drawing Sheets

CONNECTION ELEMENT FOR CONNECTING TWO COMPONENTS OF A PARTITION WALL AS WELL AS THE USE OF SUCH A CONNECTION ELEMENT

This is a continuation of application No. PCT/EP99/06923 filed Sep. 18, 1999.

The present invention relates to a connection element for connecting two components of a partition wall, comprising two clamping flanges interconnected via a connection stay. Furthermore, the present invention relates to the use of such a connection element for connecting a partition element of a partition wall to a column, or for interconnecting two partition elements of a partition wall.

There is a vast range of different partition walls which are made up by joining prefabricated components (partition elements and if applicable, columns). This large number of different systems primarily reflects the fact that such partition walls are designed for use in a host of different applications. One typical area of application is the subdivision of open plan offices into individual zones, either open areas or closed cells, for example conference rooms. Such partition walls are also used for shielding individual workplaces, for example from view and/or from undesired light incidence. Furthermore, the use of such partition walls is widespread in the area of exhibitions and trade fairs.

Interconnection of the individual components of the partition wall can be in various ways. Known are in particular connections by means of Velcro material (e.g. CH-632034-A5, FR-2570408-A1, DE-4207644-A1), by means of magnetic forces (e.g. DE-9218938-U1, EP-087723-A2, EP-0178504-A1), by means of hooks provided on the partition elements (e.g. DE-7222826-U1) or by means of mechanical connection elements of the type mentioned in the introduction. In the context of interconnecting partition wall components of the type last mentioned, in particular U.S. Pat. Nos. 4,232,724, 4,777,777, FR-2479306-A1, GB-2051916-A and WO-95/28532 form a relevant state of the art. However, all these documents only relate to interconnection of two partition elements by means of the connection elements stated in the introduction. In contrast, there are no provisions for connecting partition elements to columns.

U.S. Pat. No. 5,531,539 too describes the use of connection elements of the type mentioned in the introduction for connecting two components of a partition wall. The respective connection element comprises two prismatic clamping flanges of triangular cross section; it can be used both for rigidly interconnecting two aligned partition elements and for rigidly connecting a partition element to a column.

It is the object of the present invention to achieve increased flexibility in the design and application options of partition walls where the individual components are interconnected by using the connection elements stated in the introduction, while using identical parts as far as possible. This last criterion is important against the background of keeping production costs and inventory holding costs as low as possible.

According to the present invention, this object is met in that the connection element is asymmetrical; in that the cross section of the two clamping flanges is different, with the contour of a first clamping flange being out-of-round at least in some areas, and with the contour of the other, second clamping flange being round at least in some areas. The connection element being used within the scope of the present invention thus is of asymmetrical construction such that the cross section of the two connection flanges differs. The contour of one of the two clamping flanges is round at least in some areas. This is essential for pivotability of this clamping flange (which for the sake of simplicity is hereinafter referred to as "round") in a corresponding groove of a partition wall component which accommodates said clamping flange. The contour of the other clamping flange is out-of-round at least in some areas. This is again essential for non-pivotable torsionally resistant accommodation of this clamping flange (which for the sake of simplicity is hereinafter referred to as "out-of-round") in a corresponding groove of a second partition wall component which is to be connected to the first partition wall component, using the connection element according to the invention.

For clarification it must be pointed out that the transition region between each of the clamping flanges and the connection stay can neither be regarded as being "round" nor "out-of-round" in the sense of the present invention. When determining the cross-sectional shape of the clamping flanges, this transition region is not taken into account.

As is shown in the following explanations concerning the present invention, the construction of the connection element according to the invention, as explained above, is of central importance for the ability of said connection element to be used in the same way for interconnecting two partition elements and for interconnecting a partition element to a column which is in particular provided in the region of a corner connection. It is above all in the context of this partition element-to-column connection where the invention distinguishes itself by a hitherto unknown degree of flexibility in regard to the design of the partition wall. When the connection element according to the invention is used for connecting a partition element of a partition wall to a column, the out-of-round clamping flange of the connection element is accommodated in a groove of the column so as to be positive-locking and torsionally resistant. By contrast, the round clamping flange of the connection element is accommodated so as to be pivotable on its longitudinal axis, within a specified angular range, in a groove of a connection profile provided on the margin-side of the partition element.

Positive-locking torsionally resistant accommodation of the out-of-round clamping flange of the connection element in a groove of the column results in positive fastening of the connection element to the column in a specified defined position. By contrast, accommodation of the round clamping flange of the connection element in a groove of a connection profile of the partition element, said clamping flange being pivotable along its longitudinal axis within a specified angular range, results in infinitely variable positions, within said angular range, of the partition element in relation to the column. In this context it is significant that for connecting a partition element to a column, only one connection element, if necessary comprising several segments arranged axially in a row, is provided to enable pivotability of the partition element on the axis of the round clamping flange of the connection element. Because the out-of-round clamping flange is accommodated in a groove of the column so as to be positive-locking and torsionally resistant, so that as previously explained, the position of the connection element to the column is clearly determined, the groove aperture in the region of the surface of the column can be particularly narrow. The inside clearance of the aperture of the groove needs to be only slightly larger than the thickness of the connection stay of the connection element. This is significant in particular in the context of the visual appearance of the column, for in this way, even if there is a substantial number of grooves arranged so as to be spaced around the circumference, it maintains a columnar character with a relatively closed surface.

The groove of the connection profile of the partition element explained above is configured such that within a specified angular area said groove is not only pivotable on the longitudinal axis of said angular area and able to accommodate the round clamping flange of the connection element, but it is also suitable for non-pivotable positive-locking torsionally resistant accommodation of the out-of-round clamping flange of the connection element. This double function of the groove is of significant importance with a view to the use of a connection element according to the invention for interconnecting two partition elements of the same type. Accommodating the out-of-round clamping flange of the connection element in a positive-locking and torsionally resistant way in the groove of the connection profile of the one partition element, precludes the possibility of two partition elements directly interlinked, being laterally offset in relation to each other. Furthermore, by using suitable additional means (e.g. end stops), angular offset can be prevented so that two partition elements directly interlinked using the connection element according to the invention, are aligned precisely in relation to each other, without the use of any further equipment.

The present invention thus makes it possible to use one and the same connection element for connecting a partition element of a partition wall both to an identically constructed further partition element and to a column. In the connection between partition element and partition element, the two linked partition elements can assume in particular a fixed specified position where they are mutually aligned, while the connection between partition element and column includes a considerable measure of design freedom in that the position of the partition element in relation to the column, within a specified angular range, is infinitely variable in its adjustment. Thus a single type each of the partition element and of the connection element is sufficient to build a wide range of differently constructed partition walls.

Within the scope of the present invention the clamping flange, which for the sake of simplicity is referred to as "out-of-round", whose contour is out of round at least in some areas, can also be curved in some areas. Thus within the scope of the present invention, for example a clamping flange of cylindrical basic shape with a protruding rib which for torsionally resistant accommodation of said clamping in a groove of the connection profile of the partition element or of a column, engages a corresponding recess of the respective groove. Conversely, the clamping flange, which for the sake of simplicity is referred to as "round", whose contour is round at least in some areas, can be flattened or comprise a rib as far as this does not impede the pivotability, within the specified angular range, of this clamping flange, on its longitudinal axis in a groove of the connection profile of the partition element.

A first preferred development of the invention is characterised in that the cross section of the first out-of-round clamping flange of the connection element is polygonal. It is particularly preferred if the basic shape of the first out-of-round clamping flange is rectangular, whereby the corners can be at least partly bevelled. This results in a hammer-shaped design of the out-of-round clamping flange.

According to another development of the invention, the second round clamping flange comprises a slot. In a particularly preferred embodiment it comprises a cylindrical space delimited by two sprung cheeks. The slot or the cylindrical space of the round clamping flange accommodates an expansion element. With this expansion element the round clamping flange can be expanded to provide firm contact with the interior wall of the respective groove of the connection profile of the associated partition element, so as to fasten in a non-positive way, the connection element and the partition element in the desired mutual position. The expansion element can in particular be designed as a rotatable eccentric disk. It is particularly useful if the rotatability of the eccentric disk is delimited by two end stops, with one of the end stops defining the position of minimal expansion of the respective clamping flange, and the other end stop defining the position of maximum expansion.

A particularly preferred development of the connection element according to the invention, whose round clamping flange comprises a slot, is characterised in that the clearance of the slot is at least as large as the difference between the diameter of the round clamping flange and the inside clearance of the aperture of the groove of the connection profile of the partition element. With such dimensioning of the round clamping flange of the connection element on the one hand, and the groove of the connection profile of the partition element on the other hand, the round clamping flange can be compressed such that it can be inserted into the groove through the lateral aperture of said groove. In this way, during construction of the partition wall, axial insertion of the connection element by its round clamping flange, into the respective groove of the connection profile of the partition element, can be avoided. The latter can be clipped laterally onto the round clamping flange of the connection element which by its out-of-round clamping flange has been inserted in a groove of a further partition element or a column. This is of particular advantage with a view to the subsequent redesign of an already existing partition wall; for in this way, an existing partition wall can be expanded as desired by further partition elements without first having to remove or dismantle further partition elements. Only when the partition element has been clipped onto the round clamping flange of the connection element, is the expansion element inserted into the round clamping flange so as to expand it, to prevent lateral pulling-off of the partition element from the connection element and if necessary, in addition, to ensure fixing the angle set between the partition element and the connection element.

The column which is insertable within the scope of the present invention preferably comprises a multitude of matching grooves which are arranged around the circumference of the column at a spacing of 45°. In this case it is particularly preferred if the specified angular range within which the round clamping flange is pivotable on its longitudinal axis, in a groove of the connection profile of the partition element, is ±15°. In this case, each of the basic positions of two partition elements connected to a particular column (90°, 135°, 180°) can be increased or decreased by a total of 30° as a result of the free play of ±15° present at both partition elements. This means that the two partition elements connected to the column in this case can be arranged at any desired angle in relation to each other. Certain angular positions (e.g. 120°) can even be achieved in two ways, namely by increasing the 90° base position by twice 15° or by reducing the 135° base position for example by 15° once.

Another development of the invention is characterised in that the exterior surface of the column on both sides of the aperture of each groove comprises outward projecting ribs. These ribs stop light entering between the column and the connection profile of the partition element if, as is the case in a preferred development of the invention, it is not an uninterrupted connection element that is provided for connecting the partition element to the column, but instead, a connection element which is divided into several segments arranged at axial spacing in relation to each other.

Another preferred development of the invention is characterised in that on its side facing the column, the connection profile comprises concave contact surfaces. The curvature of the contact surfaces essentially corresponds to the curvature of the surface of the column between two grooves. The specified angular range within which the partition element is pivotable on the longitudinal axis of the round clamping flange, is limited by one of the two contact surfaces resting against the surface of the column. Such area contact prevents damage to the column and/or to the connection profile.

Insofar as the column on its outer surface comprises outward projecting ribs (see above) on both sides of the apertures of the grooves, then the connection profile in the transition region between the groove and the contact surfaces, too, comprises corresponding recesses for the ribs. If the partition element is pivoted to one of its end stop positions, then one of the ribs of the column enters the corresponding recess of the connection profile of the partition element.

As mentioned above, in view of flexibility in the design of the partition element it is significant that connection of a partition element with a column via only one connection element (if necessary comprising several segments) takes place. Interconnection of two partition elements is also achieved correspondingly via only one connection element (if necessary comprising several segments). In this way the connection element can be arranged in the region of the centre axis of the interconnected partition elements. This in turn makes it possible that according to a preferred development of the invention, the dimension of the connection profiles of the partition elements transversely to the centre axis is significantly shorter than the thickness of the partition bodies of the partition elements. In this way a concealed joint is created in the region of the interconnection of two partition elements. If required, said concealed joint, provided with a cover, can be used as a cable duct.

According to another preferred development of the invention, the connection profile of the partition element comprises two laterally arranged cross-shaped grooves. In particular perforated rails which are used to attach accessories to the respective partition element, can be inserted into said cross-shaped grooves. Correspondingly, the grooves of the column can comprise additional recesses into which further perforated rails can be inserted. In this way accessories can also be attached to the column.

Finally, according to a development of the invention it can be provided for the connection profile to comprise an axial multi-purpose drill hole. It can in particular at the lower edge of the partition wall be used to attach a foot. Furthermore, such a multi-purpose drill hole can be used to accommodate a connection bolt which interconnects two partition elements, one arranged on top of the other.

Below, the present invention is explained in more detail with reference to the enclosed drawing, as follows.

Figure 1:
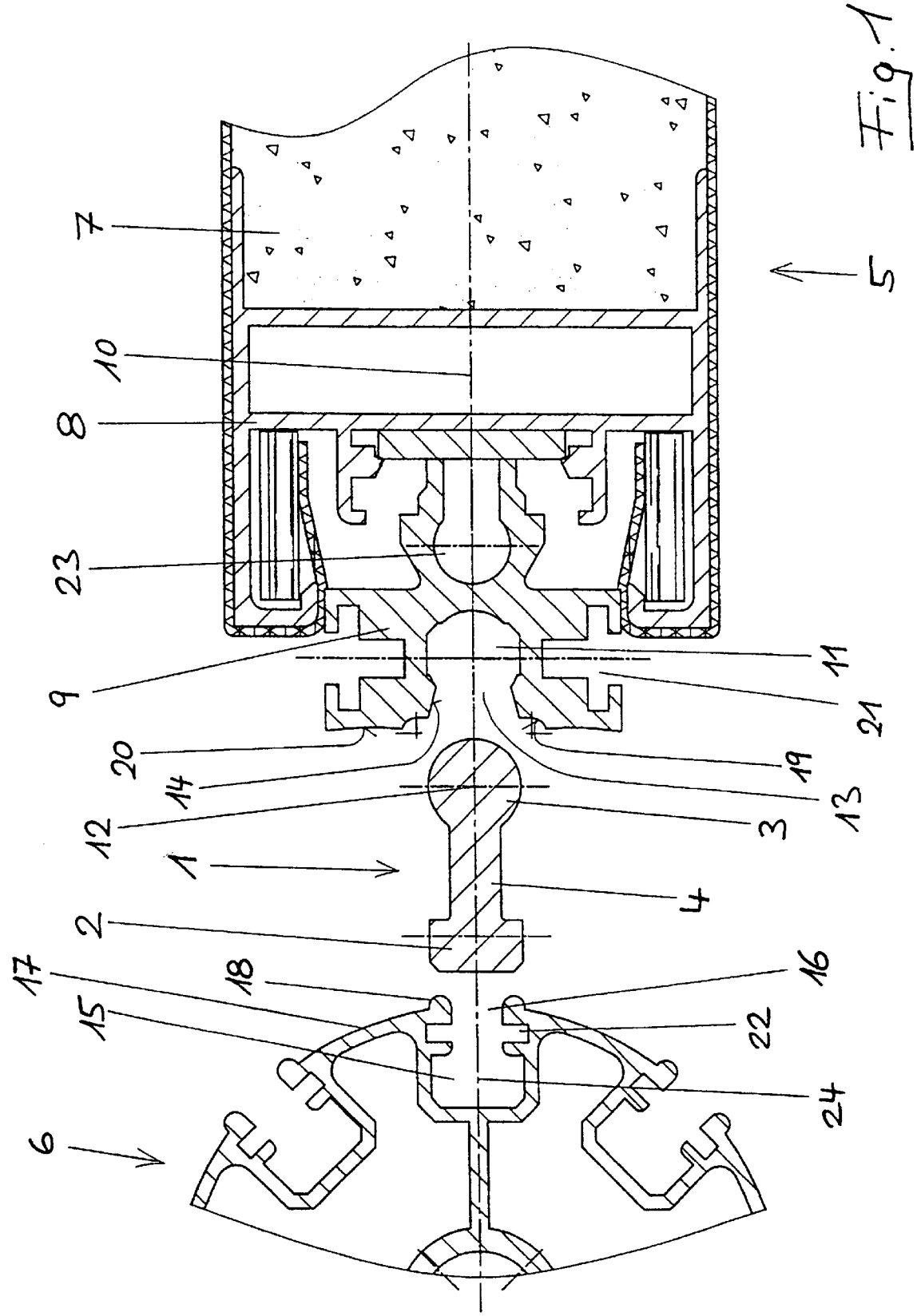
FIGS. 1 to 3 show the connection between a partition element and a column, using a first preferred embodiment of the connection element according to the invention.
Figure 2:
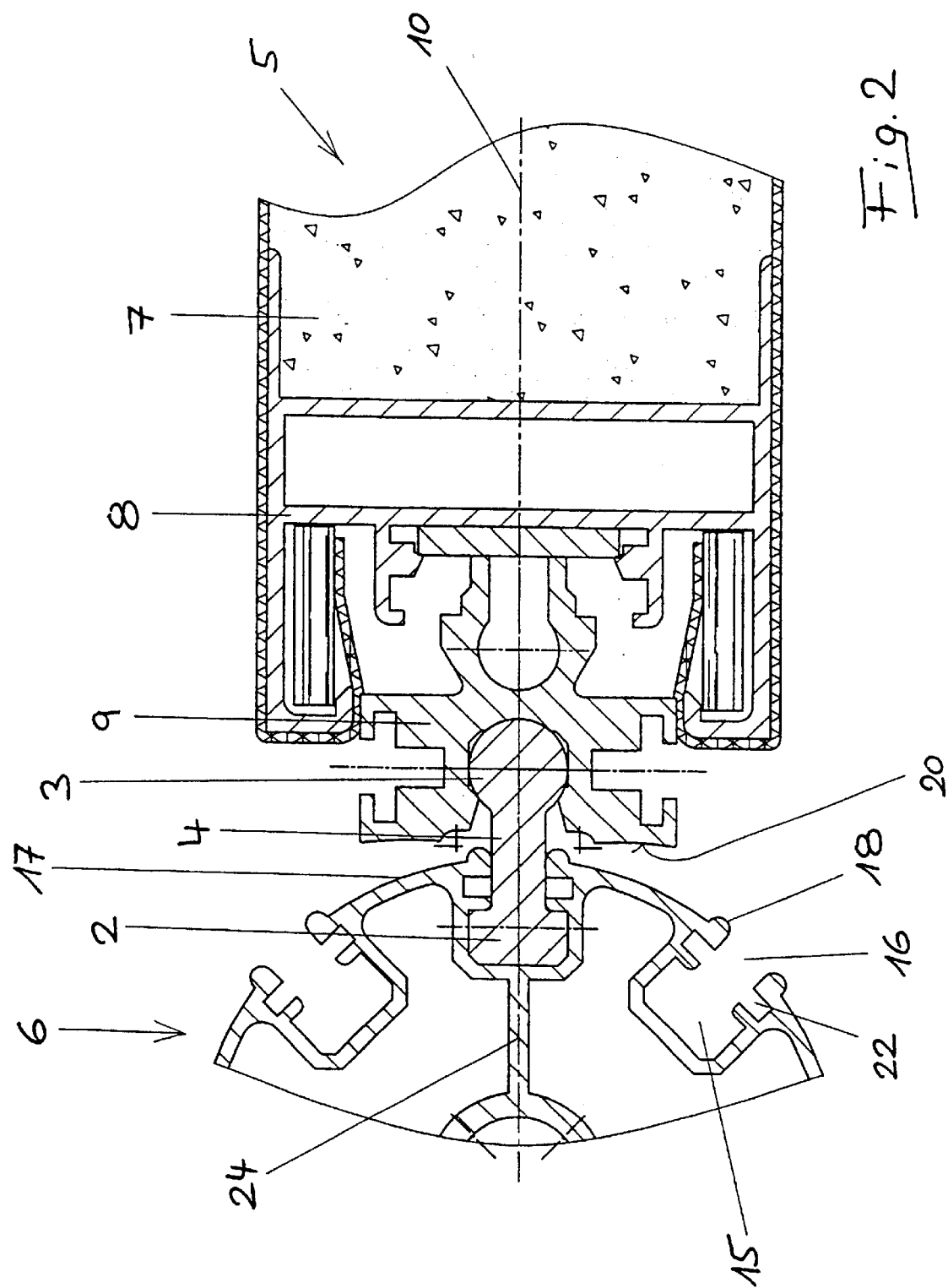
Figure 3:
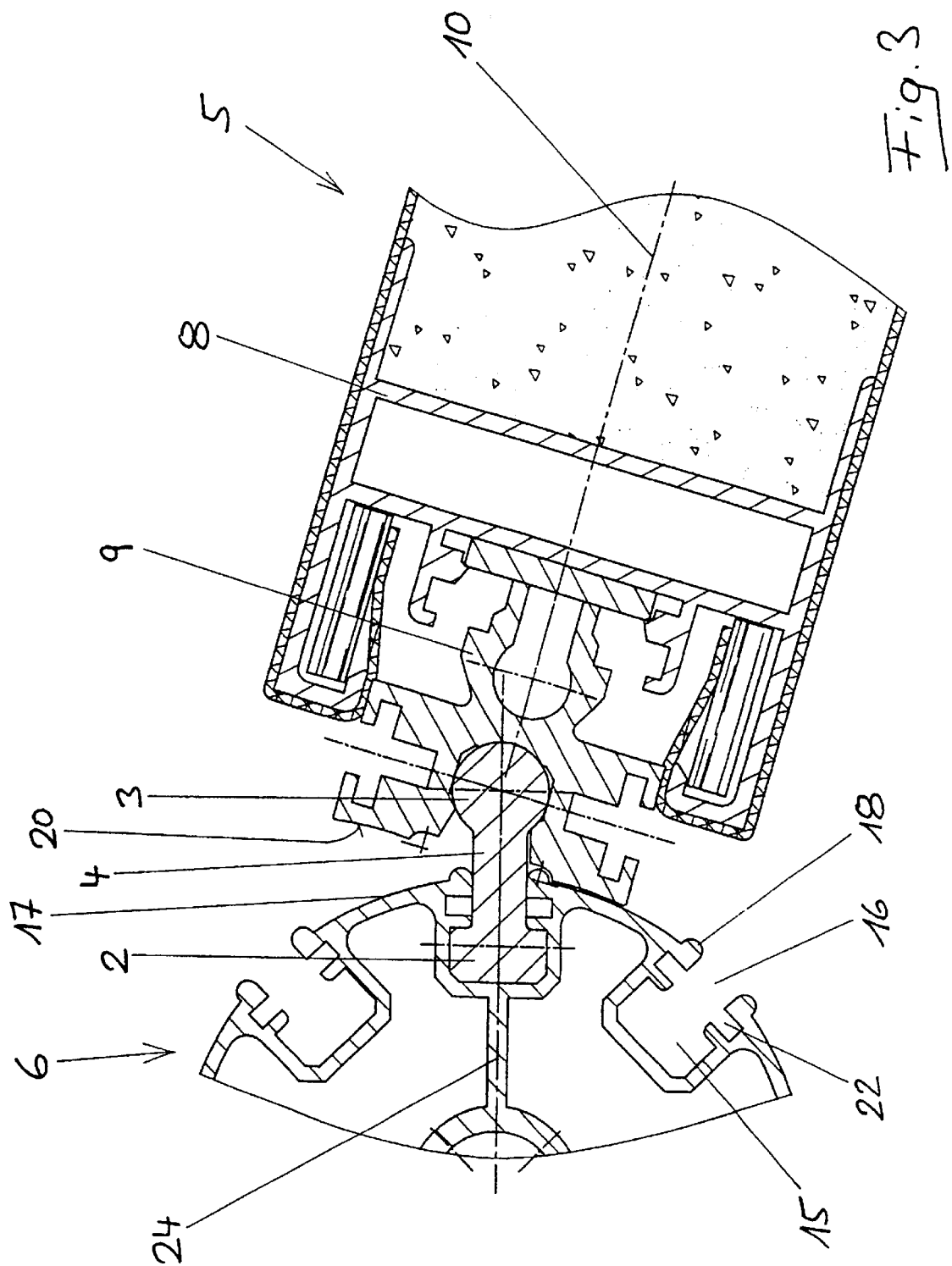

According to FIGS. 1 to 4, the connection element 1 comprises a first clamping flange 2 and a second clamping flange 3 which are interconnected by way of a connection stay 4. The first clamping flange 2 is of rectangular basic shape, with the two outward-projecting edges being flattened to form a hammer-shaped cross section. The second clamping flange 3 is of circular cross section. By using the connection element 1, a partition element 5 can be interconnected with a column 6 of a partition wall, as shown in FIGS. 1 to 3. The partition element 5 comprises a partition body 7, a frame profile 8 firmly connected to said partition body 7, and a connection profile 9 fastened to said frame profile 8. If the partition body 7 and the connection profile 9 are designed accordingly, within the scope of the present invention said connection profile 9 could of course also be installed directly to the partition body 7. The design of the partition body 7 and the frame profile 8 is immaterial for the present invention; to this extent it will not be explained in further detail.

The connection profile 9 is essentially T-shaped. In the context of the present invention, the design of the groove 11 arranged in the centre plane 10 is decisive. This groove is suitable for accommodating both the first clamping flange 2 and the second clamping flange 3 of the connection element 1. The contour of the groove 11 thus results from the overlaying of the contours of the two clamping flanges 2 and 3 of the connection element 1. The design and dimensions of the two clamping flanges 2 and 3 of the connection element 1 are selected such that in the previously described overlaying, the contour of the groove in some sections corresponds to the contour of the first, out-of-round clamping flange 2 while in other sections it corresponds to the contour of the second, round clamping flange 3. The result of this is that the groove 11 is suitable both for accommodating the first clamping flange 2 and for accommodating the second clamping flange 3, with the second clamping flange 3 due to its round cross-section in the groove 11 being rotatable on its axis 12. By contrast, the first clamping flange is accommodated in the groove 11 so as to be positive-locking and torsionally resistant. The connection element 1 whose second, round clamping flange 3 is accommodated in the groove 11 of the connection profile 9, can thus be pivoted on axis 12, with the pivot region being limited. Said pivot region is defined by the inside clearance of the aperture 13 of the groove 11; in the present example this is ±15°. The aperture 13 of the groove 11 is formed by bevelled contact surfaces 14 which together encompass an angle of 30°.

FIG. 3 shows that the contour of the grooves 15 of the column 6 exactly matches the contour of the first clamping flange 2 of the connection element 1. The groove 15 of the column 6 can thus accommodate the first clamping flange 2 of the connection element 1 in a positive-locking and torsionally resistant manner. The inside clearance of the aperture 16 of the groove 15 is only slightly larger than the thickness of the connection stay 4 of the connection element 1.

On its exterior surface 17, the column 6 comprises outward projecting ribs 18 on both sides of the aperture 16 of each groove 15. Adjacent to the aperture 13 of the groove 11, the connection profile 9 comprises recesses 19 which correspond to these ribs. The functions of the ribs 18 and the recesses 19 are explained in more detail below with reference to FIG. 3. This also applies to the concave contact surfaces 20 of the connection profile 9.

Furthermore, the connection profile 9 comprises two cross-shaped grooves 21 open at the side. Each of these grooves 21 is designed in particular to accommodate a perforated rail on which accessories can be attached to the respective partition element 5. Correspondingly, opposing recesses 22 are provided in the region of the grooves 15 of the column 6, said recesses 22 also being designed to accommodate a perforated rail each. The connection profile 9 also comprises a multipurpose drill hole 23, which is in particular designed for attachment of a foot to the respective partition element 5 and for accommodating a connection bolt used to fasten an adjacent partition element.

FIG. 2 shows the unit comprising a column 6, a partition element 5 and a connection element 1 interconnecting these two components of a partition wall. The first clamping flange 2 of the connection element 1 is accommodated in the groove 15 of the column 6 so as to be torsionally resistant and positive-locking. By contrast, the connection element 1 and the partition element 5 are pivotable in relation to each other, on the axis 12 of the second clamping flange 3 accommodated in the groove 11 of the connection profile 9. Thus the partition element 5 can be pivoted 15°, from the position shown in FIG. 4 in which the centre line 10 of the partition element is aligned with the centre line 24 of the groove 15 of the column 6.

FIG. 3 shows the situation with a partition element 5 pivoted to one of its two end-stop positions. One of the concave contact surfaces 20 of the connection profile 9 rests against the curved exterior surface 17 of the column 6 while the adjacent rib 18 of the column 6 enters the associated recess 19 of the connection profile 9. Also, one of the contact surfaces 14 rests against the connection stay 4 of the connection element 1. In this way the angular range available for pivoting of the partition element 5 is limited by several interacting end stops.

Figure 4:
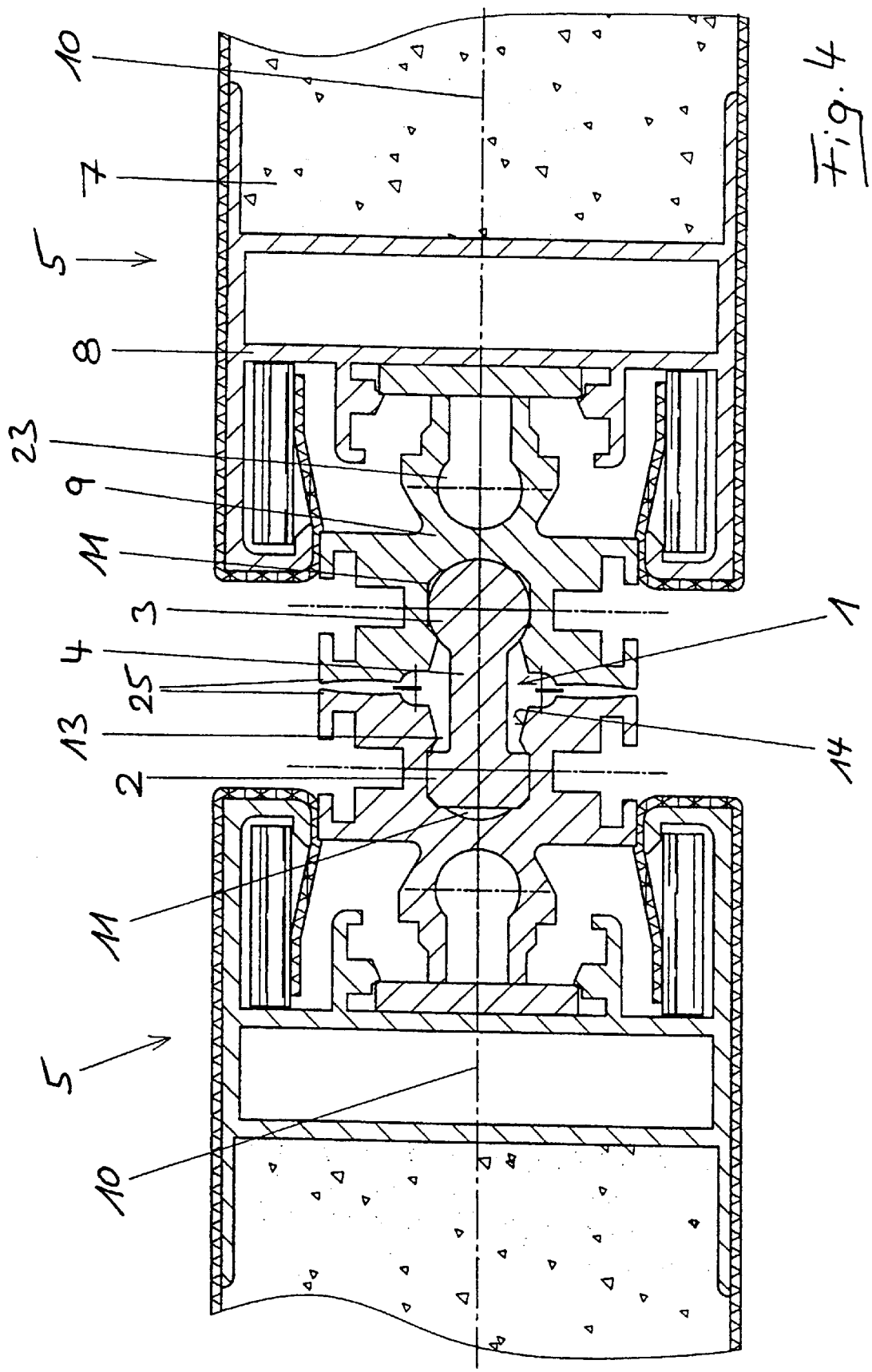
FIG. 4 shows the linear connection of two identical partition elements of the type shown in FIGS. 1 to 3, also using the connection elements shown in FIGS. 1 to 3.

FIG. 4 illustrates the interconnection of two partition elements 5 with identical connection profiles 9, using the same connection element which in FIGS. 1 to 3 is used to connect a partition element to a column. From the explanations provided above in relation to FIGS. 1 to 3, FIG. 4 of the drawing can easily be understood; consequently there is no need for extensive further information. FIG. 4 clarifies why the groove 11 of the connection profile 9 is suitable for accommodating both the first clamping flange 2 and the second clamping flange 3 of the connection element. In this way two partition elements can be interconnected, using the same connection element 1 which according to FIGS. 1 to 3 is used for connecting a partition element to a column.

Torsionally resistant and positive-locking accommodation of the first clamping flange 2 of the connection element 1 in the associated groove 11 of one of the connection profiles 9, already securely prevents the two partition elements to be interlinked, from being laterally offset in relation to each other. In addition, as a result of the two facing connection profiles 9 in the region of their outer edges 25 contacting each other, pivoting of the two partition elements in relation to each other on axis 12 of the second clamping flange 3, is safely prevented. This ensures that the two interconnected partition elements 5 are precisely aligned with each other without the need for further devices.

FIG. 4 shows that the extension of the connection profiles 9 transversely to the centre axis 10 is less than the thickness of the partition elements 5. In this way, in the region of the connection between two partition elements 5 a concealed joint forms. if required, this concealed joint can be used as a cable duct or similar.

Figure 5:
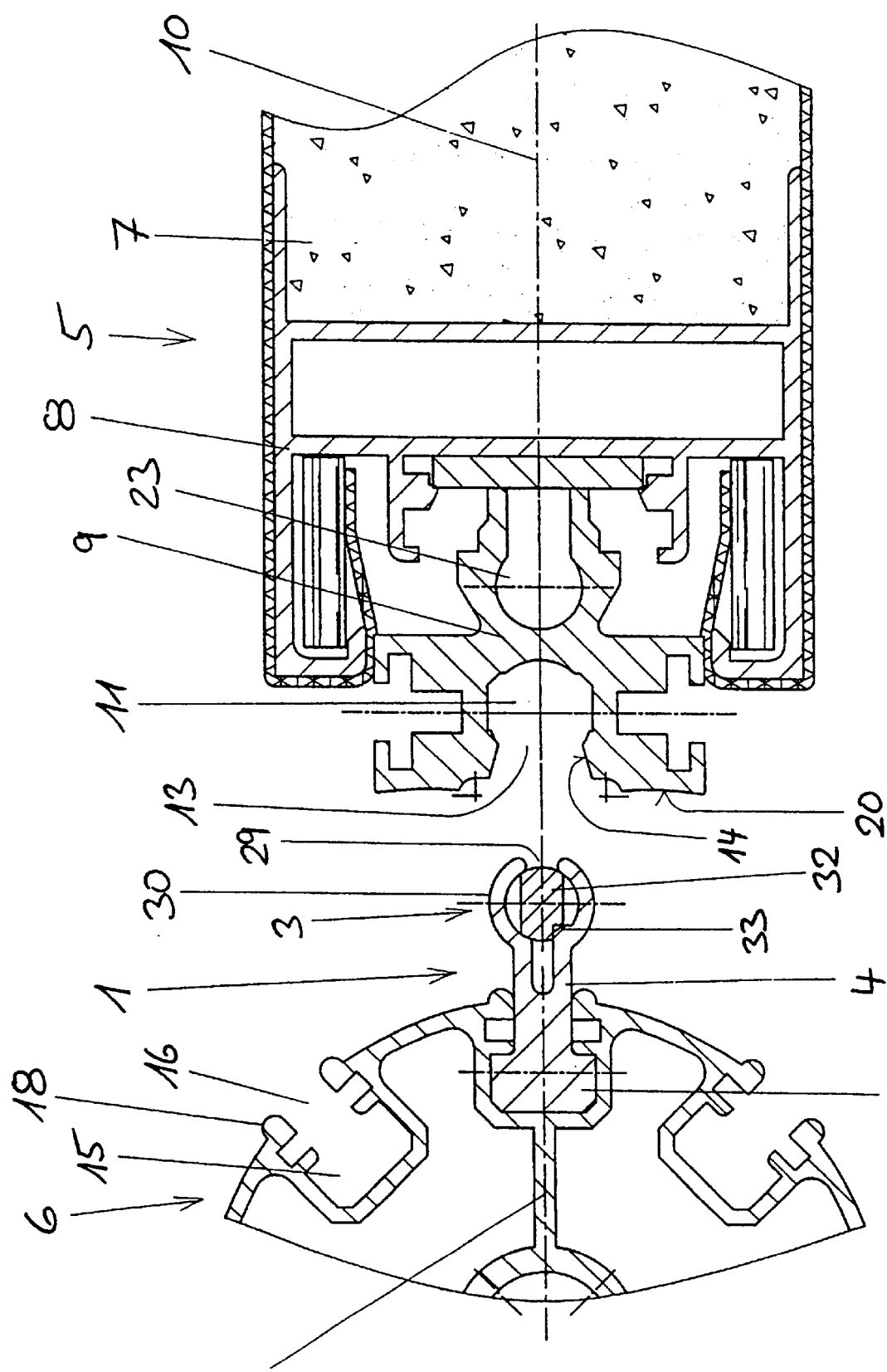
FIGS. 5 and 6 show the use of a second preferred embodiment of the connection element according to the invention for connecting a partition element to a column.
Figure 6:
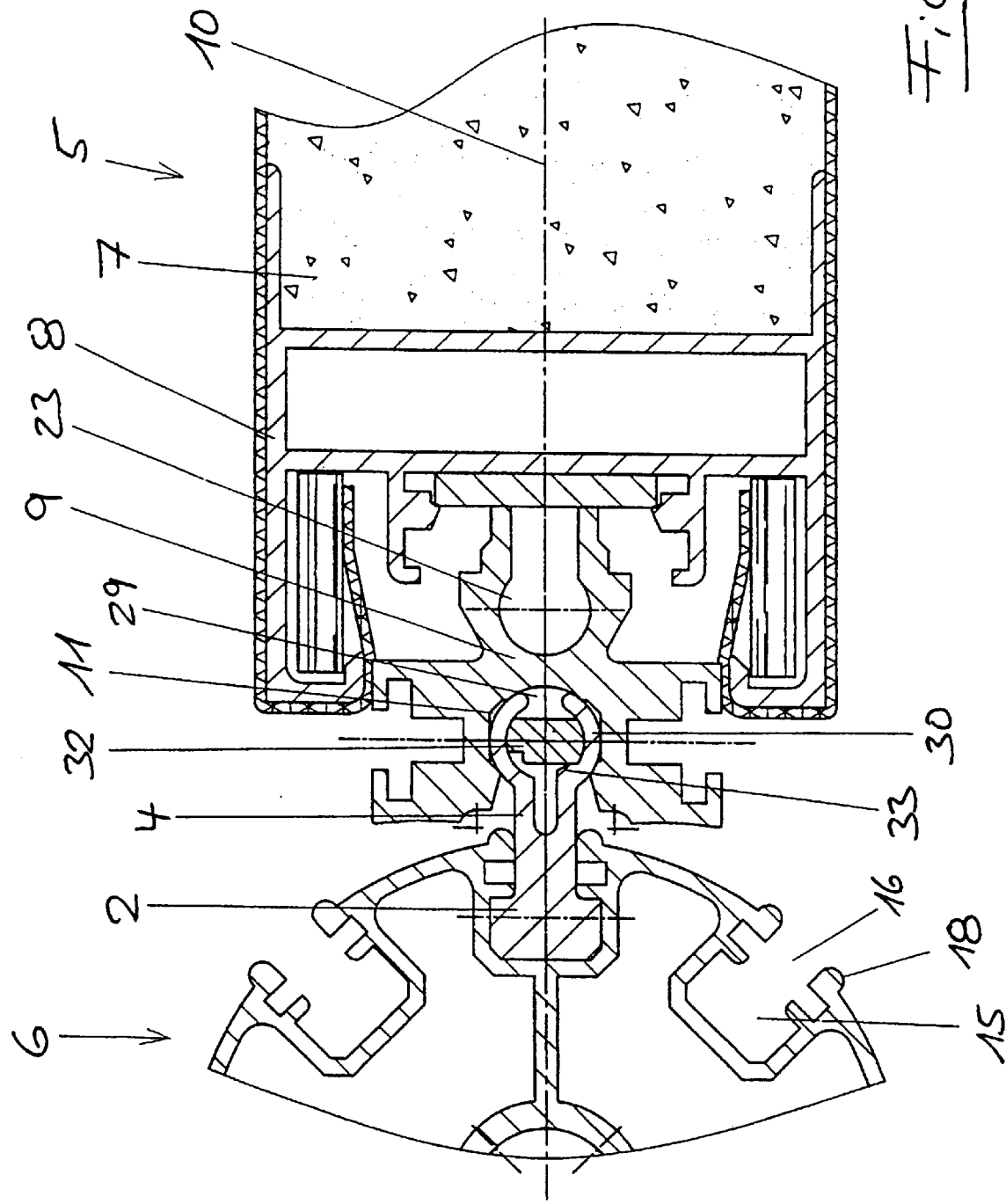

FIGS. 5 and 6 illustrate a modification of the connection element which in the text above has been explained with reference to FIGS. 1 to 4. In this embodiment the round clamping flange 3 is hollow and incorporates a slot. The round clamping flange 3 is thus formed by two cheeks 30 encompassing a hollow space 28, with the hollow space 28 being open to the outside by a gap 29 present between the opposing ends of the cheeks 30. The cheeks 30 are made so as to be sprung. Between them, an expansion element, configured as a flattened toggle 32, is arranged in the hollow space 28. The toggle 32 can be rotated on its longitudinal axis with rotatability being limited to 90° by the end stop 33. While in the position of the toggle 32 shown in FIG. 5, the cheeks 30 can spring in so that the round clamping flange 3 in flattened form can be inserted into the groove 11 through the aperture 13, the toggle 32 in its position rotated by 90°, as shown in FIG. 6, prevents the cheeks 30 from being pressed together, so that a firm connection results between the connection element 1 and the connection profile 9. The toggle 32 even expands the cheeks 30 to provide firm, frictionally-engaged contact with the interior wall of the groove 11 so that the angular position between the partition element 5 and the column 6 is fixed. Apart from this, the connection shown in FIGS. 5 and 6 corresponds to the system explained above according to FIGS. 1 to 3, so that no further explanations are required at this point.

Figure 7:
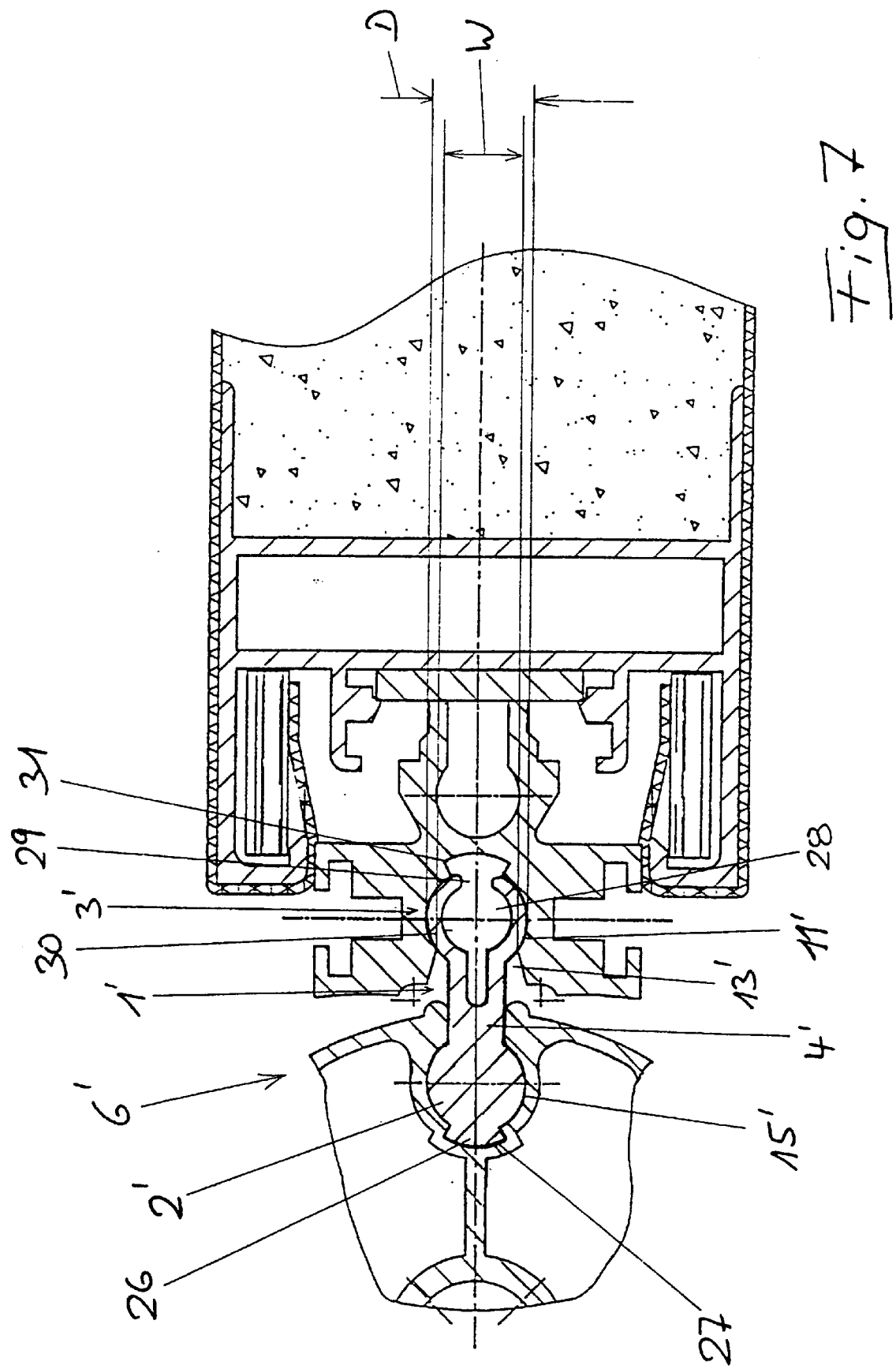
FIG. 7 shows the use of a third preferred embodiment of the connection element according to the invention, for connecting a partition element to a column.

FIG. 7 illustrates the situation explained above with reference to FIGS. 1 to 3, with the use of a modified connection element 1'. According to FIG. 7, the cross-section of the first "out-of-round" clamping flange 2' is essentially round, except that it comprises a laterally projecting rib 26. For torsionally resistant, positive-locking, non-rotatable accommodation of this first clamping flange 2', the groove 15' of the column 6' comprises a corresponding recess 27 which extends around the same circumferential region as does the rib 26. The second, round clamping flange 3', again is of cylindrical exterior surface, which ensures the pivotability of the connection element 1' on the axis 12' of the second clamping flange 3' accommodated in the groove 11' of the margin profile 9'. The second clamping flange 3' comprises a hollow space 28. Furthermore it comprises a slot so that the hollow space 28 is open towards the outside via a gap 29. Consequently the second clamping flange 3' is thus reduced to two sprung cheeks 30. The inside clearance of the gap 29 is larger than the difference between the diameter D of the second, round clamping flange 3' and the inside clearance W of the aperture 13' of the groove 11' of the connection profile 9'. In this way, the sprung cheeks 30 of the second clamping flange 3' can be pressed together to such an extent that the respective flattened second clamping flange 3' can be inserted from the side into the groove 11' through the aperture 13'. When the second clamping flange 3' has fully entered the groove 11', the cheeks 30 spring back into their home position in which they contact the interior wall of the groove 11'. An expansion element (not shown) is then inserted into the hollow space 28, said expansion element pre-tensioning the sprung cheeks 30 to ensure firm contact with the interior wall of the groove 11'. The groove 11' of the connection profile 9' comprises a recess 31 whose shape corresponds to the recess 27 of the groove 15' of the column 6'. It serves to accommodate the rib 26 of the out-of-round clamping flange 2' of the connection element 1' when interconnecting two partition elements 5'.

What is claimed is:

1. A connection element for connecting two components of a partition wall comprising:
   a connection stay having a flat profile, an upper edge surface, a lower edge surface, a first end and a second end,
   a first clamping flange disposed on said first end of said stay, and a second clamping flange disposed on said second end of said stay;

wherein said connection element is of asymmetric design in that the profile of the first and second clamping flanges is different, wherein each of said first and second clamping flanges laterally protrude beyond said upper and lower edge surfaces of said stay, wherein at least the second clamping flange comprises a slot, and wherein the second clamping flange further comprises an expansion element.

2. A connection element according to claim 1, wherein the cross section of the first clamping flange is polygonal.

3. A connection element according to claim 2, wherein the first clamping flange is hammer-shaped.

4. A connection element according to claim 1, wherein the second clamping flange comprises a hollow space delimited by two sprung cheeks.

5. A connection element according to claim 1, wherein the expansion element is a rotatable eccentric disk.

6. A method of using a connection element according to claim 1 for connecting a partition element of a partition wall to a column, comprising the steps of:

positioning the first clamping flange of the connection element in a positive-locking and torsionally resistant manner in a first groove of the column, and positioning the second clamping flange in a second groove of a connection profile of said partition element so that said second clamping flange is pivotable on its longitudinal axis within a predetermined angular range.

7. The method according to claim 6, wherein the column comprises a multitude of matching grooves which are distributed and arranged around the circumference of the column at a spacing of 45°.

8. The method according to claim 6, wherein the predetermined angular range is ±15° in relation to the center axis of said second groove.

9. The method according to claim 6, wherein the second groove of the connection profile is suitably adapted for positive-locking torsionally-resistant accommodation of the first clamping flange of the connection element.

10. The method according to claim 6, wherein said first groove has a first aperture, said second groove has a second aperture, said apertures having first and second sides, and wherein the exterior surface of the column on both sides of said first aperture of said first groove further comprises outward projecting ribs.

11. The method according to claim 10, wherein the connection profile further comprises concave contact surfaces on both sides of the second aperture.

12. The method according to claim 10, wherein the connection profile in the transition region between the second aperture of the second groove and the contact surfaces comprises recesses for accommodating the ribs.

13. The method according to claim 6, wherein the connection profile has a center axis, and wherein the dimension of the connection profile transverse to the center axis is shorter than the thickness of the partition wall of the partition element.

14. The method according to claim 6, wherein the connection profile further comprises two laterally arranged cross-shaped grooves for accommodating perforated rails.

15. The method according to claim 6, wherein the connection profile further comprises an axial multi-purpose drill hole.

16. The method of using a connection element according to claim 1 for interconnecting two partition elements of a partition wall, with the two partition elements abutting at their margins and comprising opposing identical connection profiles, comprising the steps of having the first clamping flange of the connection element being accommodated in a positive-locking and torsionally resistant manner in a first groove of the connection profile of one partition element, and having the second clamping flange being accommodated in a second groove of the connection profile of the other partition element.

17. The method of using a connection element according to claim 1, wherein the inside clearance of the slot is at least as large as the difference between the diameter of the second clamping flange and the inside clearance of an aperture of a groove of a connection profile of a partition element.

18. A partition wall structure comprising:

a column, a partition element, and a connection element for interconnecting said column and said partition element, said connection element further comprising:

a connection stay having a flat profile, an upper edge surface, a lower edge surface, a first end and a second end, a first clamping flange disposed on said first end of said stay and adapted for connection to one of said column or said partition element, and a second clamping flange disposed on said second end of said stay and adapted for connection to the other of said column or said partition element;

wherein said connection element is of asymmetric design in that the profile of the first and second clamping flanges is different, wherein each of said first and second clamping flanges laterally protrude beyond said upper and lower edge surfaces of said stay, wherein at least the second clamping flange comprises a slot, and wherein the second clamping flange further comprises an expansion element.

* * * * *

UNITED STATES PATENT AND TRADEMARK OFFICE
CERTIFICATE OF CORRECTION

PATENT NO.     : 6,599,055 B2
DATED          : July 29, 2003
INVENTOR(S)    : Karl-Heinz Auer It is certified that error appears in the above-identified patent and that said Letters Patent is hereby corrected as shown below:

<u>Title page,</u>
Add item -- [30] Foreign Application Priority Data
Sept. 25, 1998  (DE)    198 44 027.8 --

Signed and Sealed this

Twenty-third Day of December, 2003

JAMES E. ROGAN
*Director of the United States Patent and Trademark Office*